United States Patent
Godard et al.

(10) Patent No.: US 12,025,225 B2
(45) Date of Patent: Jul. 2, 2024

(54) PRESSURIZED GAS TANK

(71) Applicant: FAURECIA SYSTEMES D'ECHAPPEMENT, Nanterre (FR)

(72) Inventors: Yannick Godard, Blussans (FR); Nicolas Bachelard, Belfort (FR)

(73) Assignee: FAURECIA SYSTEMES D'ECHAPPEMENT, Nanterre (FR)

( * ) Notice: Subject to any disclaimer, the term of this patent is extended or adjusted under 35 U.S.C. 154(b) by 361 days.

(21) Appl. No.: 17/524,070

(22) Filed: Nov. 11, 2021

(65) Prior Publication Data
US 2022/0154826 A1  May 19, 2022

(30) Foreign Application Priority Data
Nov. 13, 2020 (FR) ...................................... 2011655

(51) Int. Cl.
*F17C 1/00* (2006.01)
*F16J 15/10* (2006.01)

(52) U.S. Cl.
CPC .................. *F16J 15/10* (2013.01); *F17C 1/00* (2013.01); *F17C 2201/0109* (2013.01); *F17C 2205/0302* (2013.01); *F17C 2221/012* (2013.01)

(58) Field of Classification Search
CPC .................. F17C 2205/0302; F17C 2205/0305
See application file for complete search history.

(56) References Cited

U.S. PATENT DOCUMENTS

| 5,819,978 A | * | 10/1998 | Hlebovy | F17C 1/16 220/601 |
| 2009/0071930 A1 | * | 3/2009 | Sato | F17C 1/06 215/380 |
| 2011/0210128 A1 | * | 9/2011 | Strack | F17C 1/00 29/428 |
| 2011/0304083 A1 | * | 12/2011 | Strack | B29C 45/14467 425/523 |
| 2014/0042703 A1 | | 2/2014 | Tarapata et al. | |

(Continued)

FOREIGN PATENT DOCUMENTS

| BE | 807953 A | 3/1974 |
| CA | 2078286 A1 | 7/1993 |

(Continued)

OTHER PUBLICATIONS

Preliminary Research Report for French Application No. 20 11655 dated Jul. 20, 2021.

*Primary Examiner* — Don M Anderson
(74) *Attorney, Agent, or Firm* — Carlson, Gaskey & Olds, P.C.

(57) ABSTRACT

A tank for pressurized gas such as hydrogen, comprises a paste sealant, a sealing envelope, and a base comprising a recess accommodating a neck. A substantially annular external cavity is between a convex surfaces of the neck and a concave surfaces of the recess A substantially annular inner cavity is between a concave surface of the neck and a convex surface of the recess. The paste sealant occupies the annular external and annular inner cavities uniformly and thus ensures the mechanical strength and the gas seal between the sealing envelope and the base. The sealing envelope comprises a body and a neck on the surfaces of which at least two angularly equidistant protrusions extend radially.

16 Claims, 3 Drawing Sheets

(56) References Cited

U.S. PATENT DOCUMENTS

| | | | | |
|---|---|---|---|---|
| 2015/0197382 A1* | 7/2015 | Aoe | ............................ | F17C 1/00 |
| | | | | 206/524.3 |
| 2016/0123538 A1* | 5/2016 | Nakamura | ............... | F17C 13/06 |
| | | | | 220/582 |
| 2017/0268725 A1* | 9/2017 | Yeggy | ......................... | F17C 1/14 |
| 2021/0102665 A1* | 4/2021 | Mahieu | .................... | F17C 13/00 |
| 2022/0316655 A1* | 10/2022 | Tsuchiyama | .............. | F17C 1/06 |
| 2022/0373085 A1* | 11/2022 | Kovalevsky | .............. | F17C 1/06 |

FOREIGN PATENT DOCUMENTS

| | | | |
|---|---|---|---|
| CN | 102267602 | A | 12/2011 |
| CN | 108622562 | A | 10/2018 |
| DE | 102011011649 | A1 | 3/2012 |
| DE | 102015100035 | A1 | 7/2015 |
| DE | 102019202130 | A1 | 8/2020 |
| FR | 2744517 | A1 | 8/1997 |
| JP | H10332082 | A | 12/1998 |
| RU | 2118745 | C1 | 9/1998 |
| SI | 23213 | A | 5/2011 |
| WO | 2013008719 | A1 | 1/2013 |

\* cited by examiner

[Fig. 1]
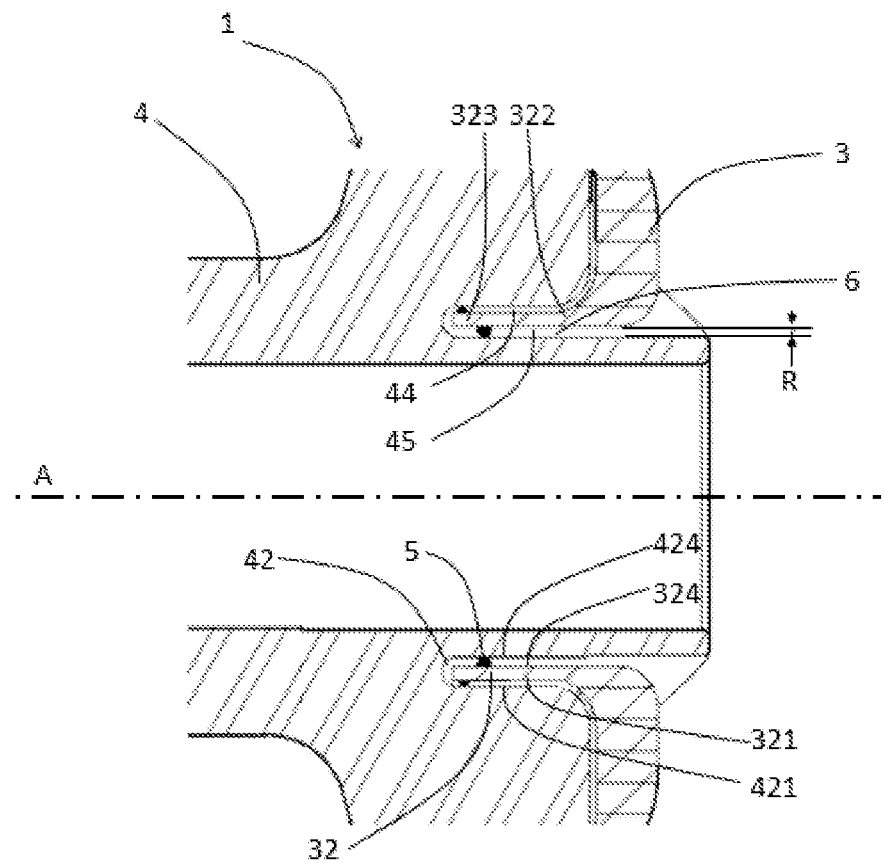
[Fig. 2]
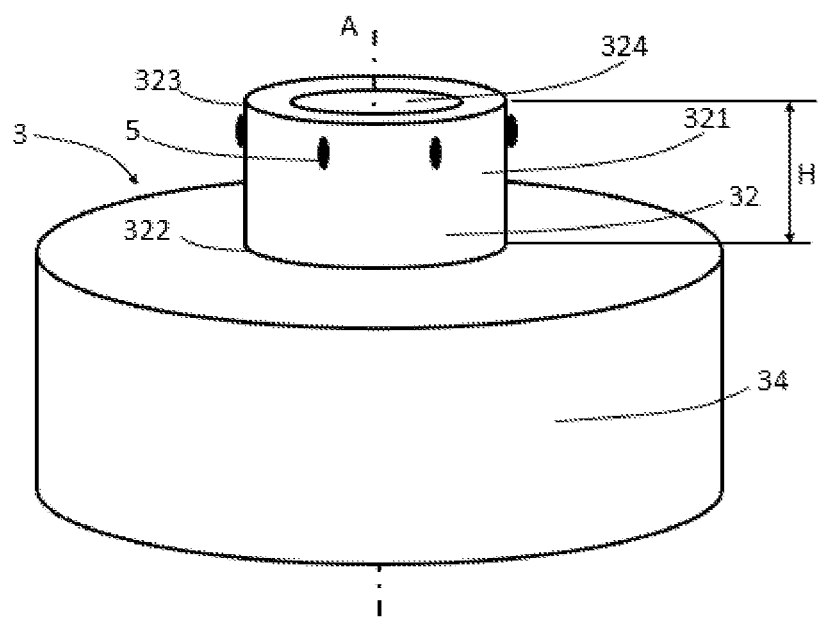

[Fig. 3a]
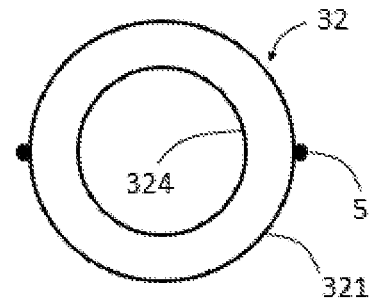
[Fig. 3b]
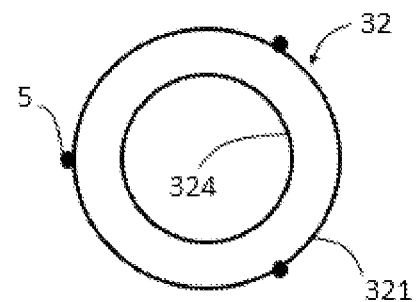
[Fig. 3c]
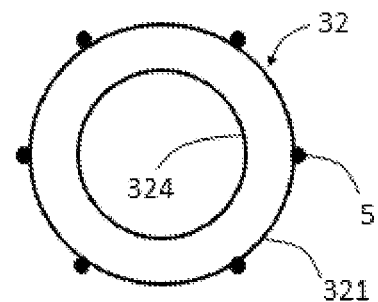
[Fig. 3d]
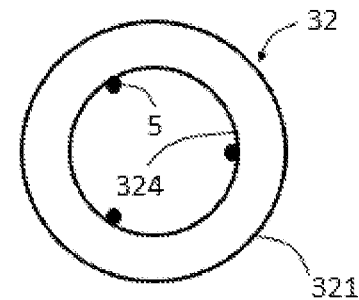

[Fig. 3e]
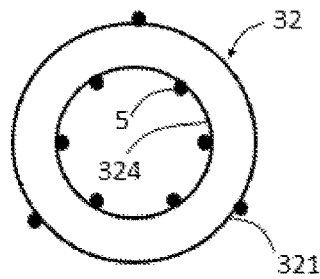
[Fig. 4]
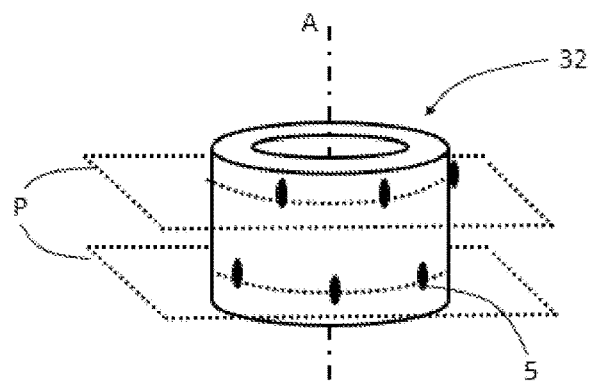
[Fig. 5a]
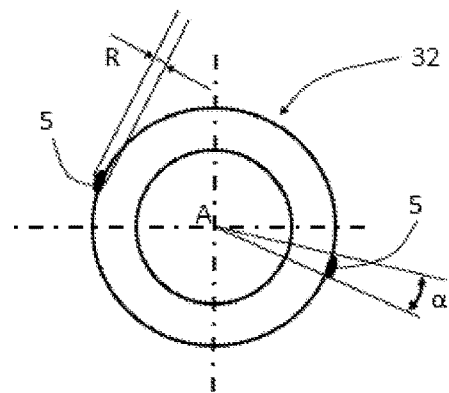
[Fig. 5b]
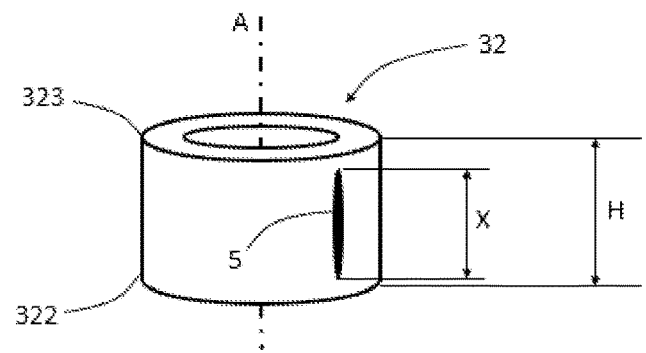

PRESSURIZED GAS TANK

CROSS-REFERENCE TO RELATED APPLICATIONS

This application is a U.S. non-provisional application claiming the benefit of French Application No. 20 11655, filed on Nov. 13, 2020, which is incorporated herein by reference in its entirety.

TECHNICAL FIELD

The disclosure relates to the field of tanks for pressurized gas, such as hydrogen.

BACKGROUND

Pressurized gas tanks comprising a base and a sealing envelope are known from the prior art, with said base comprising a substantially hollow cylindrical recess around an axis, and the sealing envelope comprising a body pierced with an opening surrounded by a substantially solid cylindrical neck extending around said axis, and being adapted to be introduced into the recess.

The sealing between the neck and the base against gas, such as hydrogen, is generally achieved by inserting at least one circumferential seal between the neck and the base.

This solution has proven to be effective in gas pressure ranges of up to 500 bar, but is less effective for gas pressures of up to 1000 bar, which are common in the field of hydrogen tanks for light vehicles.

Indeed, at such pressures, the seals can deform, extrude, and thus make it possible for gas to escape.

For pressures above 500 bar, another solution consists of gluing the neck and base together.

However, the problem in connection with using an adhesive is that it is difficult to apply evenly between the neck and the base. This can lead to having a variable adhesive thickness that may be insufficient locally to ensure mechanical strength and especially good shear strength. Under the high pressures mentioned above, this low mechanical resistance can be the cause adhesive shearing in the areas where its thickness is insufficient. This can then cause a breach in the adhesive film and thus create a gas leakage route.

SUMMARY

To provide a more uniform adhesive distribution, the disclosure proposes a device that makes it possible to center a neck of a sealing envelope in a recess of a base, ensuring a constant adhesive thickness between the neck and the base.

More precisely, according to a first aspect, the disclosure relates to a sealing envelope for a pressurized gas tank comprising a body and a neck. The body is hollow, delimits a volume, and is pierced with an opening The neck is substantially tubular, solid along an axis, surrounding the opening and comprises a substantially cylindrical convex surface and a substantially cylindrical concave surface. The neck further comprises at least two radially extending protrusions, angularly equidistant on said convex surface and/or on said concave surface.

According to a second aspect, the disclosure also relates to a container for pressurized gas such as hydrogen, comprising a paste sealant, a sealing envelope, and a base of substantially cylindrical shape around the axis. The base comprises a substantially tubular recess, hollow along the axis, the recess comprising a substantially cylindrical concave surface and a substantially cylindrical convex surface, where the recess accommodates the neck, The diameter of the concave recess surface is greater than the diameter of the convex neck surface, so as to define a substantially annular outer space between the convex neck surface and the concave recess surface. The diameter of the convex recess surface is smaller than the diameter of the concave neck surface, so as to define a substantially annular inner space between the concave neck surface and the convex recess surface, the paste sealant occupying the outer space and the inner space uniformly.

Particular features or embodiments, usable alone or in combination, are:
- the largest distance between a protrusion and a distal end of the neck is less than or equal to 50% of the neck height, preferably less than or equal to 25% and more preferably less than or equal to 10%;
- the at least two protrusions comprise at least three protrusions and preferably at least six protrusions;
- all the protrusions are dome-shaped, with a circular or oval base or in the form of rectilinear ribs substantially parallel to the axis;
- all the protrusions are arranged in at least two distinct planes perpendicular to the axis and where each plane comprises at least two protrusions;
- all the protrusions extend tangentially over an angular extent less than or equal to 10 degrees, preferably less than or equal to 5 degrees and even more preferably less than or equal to 3 degrees, and axially over an axial extent strictly less than the neck height;
- all the radial extensions of the protrusions are within a range of +/−10% of each other;
- all the radial extensions of the protrusions are less than 2 mm, preferably between 0.2 and 0.8 mm and more preferably equal to 0.5 mm;
- the difference between the radius of the convex neck surface and the radius of the concave recess surface is substantially equal to the largest radial extent, and the difference between the radius of the concave neck surface and the radius of the convex recess surface is substantially equal to the largest radial extent.

BRIEF DESCRIPTION OF THE DRAWINGS

The disclosure will be better understood from the following description, made solely by way of example, and with reference to the appended figures in which:

FIG. 1 illustrates a tank viewed partially, in cross section,

FIG. 2 illustrates an envelope viewed in perspective,

FIG. 3a illustrates a neck viewed from above with two protrusions on the convex surface, FIG. 3b illustrates a neck viewed from above with three protrusions on the convex surface, FIG. 3c illustrates a neck viewed from above with six protrusions on the convex surface, FIG. 3d illustrates a neck viewed from above with three protrusions on the concave surface, FIG. 3e illustrates a neck viewed from above with protrusions on the convex and concave surfaces, FIG. 4 illustrates a neck viewed in perspective with protrusions distributed in two planes perpendicular to the axis, FIG. 5a illustrates a neck viewed from above, and shows the radial extent and angular extent of a protrusion, and FIG. 5b illustrates a neck viewed in perspective and shows the axial extent of a protrusion.

DETAILED DESCRIPTION

According to a first aspect, illustrated by FIG. 1, the disclosure relates to a tank 1 for pressurized gas such as hydrogen. Said tank 1 comprises a paste sealant 6, a sealing envelope 3, and a base 4, of substantially cylindrical shape, about an axis. The base 4 comprises a substantially tubular recess 42, hollow along the axis.

The recess 42 comprises a substantially cylindrical concave surface 421 and a substantially cylindrical convex surface 424. The recess 42 accommodates the neck 32.

The diameter of the concave surface 421 of the recess 42 is larger than the diameter of the convex surface 321 of the neck 32. This makes it possible to define a substantially annular outer space 44 between the convex surface 321 of the neck 32 and the concave surface 421 of the recess 42.

The diameter of the convex surface 424 of the recess 42 is smaller than the diameter of the concave surface 324 of the neck 32. This makes it possible to define a substantially annular inner space 45 between the concave surface 324 of the neck 32 and the convex surface 424 of the recess 42.

Advantageously, the paste sealant 6 occupies the outer space 44 and the inner space 45 uniformly. To this end, the recess 42 is filled by the paste sealant 6, or the neck 32 is coated with paste sealant 6, or both, prior to insertion of the neck 32 into the recess 42. This paste sealant filling and/or coating makes it possible for the latter to fully occupy said outer space 44 and inner space 45, without leaving gaps or air bubbles.

More advantageously, the paste sealant 6, distributed uniformly in the outer spaces 44 and inner spaces 45, makes it possible to ensure a first sealing function between the sealing envelope 3 and the base 4.

Even more advantageously, the paste sealant 6 makes it possible to ensure a second mechanical connection function between the sealing envelope 3 and the base 4.

According to a second aspect, illustrated by FIG. 2, the disclosure also relates to a sealing envelope 3, of a material that may be polymer-based.

The sealing envelope 3 comprises a body 34 and a neck 32. Said body 34 is hollow and delimits a volume and is pierced with an opening. Said neck 32 is substantially solid tubular along the axis A and surrounds said opening.

The neck 32 comprises a substantially cylindrical convex surface 321, which constitutes the outer neck surface 32, again the largest of the cylindrical surfaces of the neck 32.

The neck 32 also comprises a substantially cylindrical concave surface 324, which constitutes the inner neck surface 32, or the smallest of the cylindrical surfaces of the neck 32.

Advantageously, the neck 32 further comprises at least two radially extending, angularly equally spaced protrusions 5 on said convex surface 321 and/or on said concave surface 324.

This arrangement of the protrusions 5, makes it possible to ensure uniform spacing between the surfaces of the neck 32 and the recess 42. Indeed, the protrusions 5, which are angularly equidistant, are interposed between the convex surface 321 of the neck 32 and the concave surface 421 of the recess 42 and/or between the concave surface 324 of the neck 32 and the convex surface 424 of the recess 42, as illustrated by FIG. 1. The protrusions 5 ensure that the facing surfaces are spaced apart. Their even, angular distribution combined with a cylindrical shape, ensures the centering.

Uniform spacing makes it possible to obtain an even thickness of the paste sealant 6. The performance of the paste sealant 6 is thus increased in terms of sealing and mechanical strength. The radial extent R of a protrusion 5 ensures that the minimum thickness of the paste sealant 6 does not become insufficient in the area of the protrusion 5. The number and distribution of the protrusions 5 ensure that this minimum thickness is distributed.

As illustrated in FIGS. 1 and 2, the neck 32 comprises a proximal end 322, defined by the junction of the neck 32 to the body 34 and a distal end 323, defined by the end of the neck 32 farthest from the body 34.

The height H of the neck 32, as illustrated in FIGS. 2 and 5b, is the distance between the proximal end 322 and the distal end 323 of the neck 32.

More advantageously, the largest distance between a protrusion 5 and the distal end 323 of the neck 32 is less than or equal to 50% of a height H of the neck 32, preferably less than or equal to 25% and more preferably less than or equal to 10%, as illustrated in FIG. 2.

This arrangement of the protrusions 5 makes it possible to ensure uniform spacing between the surfaces of the neck 32 and the surfaces of the recess 42 from the distal end 323 of the neck 32. This has the effect of increasing the aforementioned performance of the paste sealant 6.

According to one embodiment, illustrated in FIG. 3, said at least two protrusions 5 advantageously comprise at least three protrusions 5, preferably at least six protrusions 5.

Multiplying the number of protrusions 5 has the effect of making the spacing between the surfaces of the neck 32 and the recess 42 even more uniform. This further increases the aforementioned performance of the paste sealant 6, reducing the risk of the paste seal thickness becoming insufficient locally. Moreover, multiplying the number of protrusions 5 also makes it possible to shape the neck 32 and to compensate for geometrical defects. The greater the number of protrusions 5, the more the neck 32 can be reshaped, but the insertion force of the neck 32 in the recess 42 increases.

According to another embodiment, illustrated by FIGS. 1 to 4, all the protrusions 5 are dome-shaped, with a circular or oval base, or even in the form of straight ribs, substantially parallel to the axis A, as illustrated by FIG. 5b. These curved shapes ensure the least possible resistance to the paste sealant, so that the latter can be uniformly distributed, in particular during the insertion of the neck 32 into the recess 42, with this further reducing the risk of the thickness of the paste sealant 6 becoming insufficient locally.

According to another embodiment, illustrated by FIG. 4, all the protrusions 5 are arranged in at least two distinct planes P, perpendicular to the axis A, and each plane P comprises at least two protrusions 5.

The distribution of the protrusions 5 on these different planes P, has the effect of ensuring that the spacing between the surfaces of the neck 32 and the recess 42 is uniform along the axis A. This further has the effect of increasing the aforementioned performance of the paste sealant 6.

According to another embodiment, illustrated in FIG. 5a, all the protrusions 5 advantageously extend tangentially along an angular extent α of less than or equal to 10 degrees, preferably of less than or equal to 5 degrees and more preferably of less than or equal to 3 degrees.

The angular limitation a of the tangential extent of the protrusions 5 has the effect of not blocking the distribution of the paste sealant 6 upon insertion of the neck 32 into the recess 42 along the axis A.

More advantageously, as illustrated by FIG. 5b, all the protrusions 5 extend axially along an axial extent X that is strictly less than the height H of the neck 32 along the axis A.

The limitation of the axial extent X of the protrusions 5 has the effect of not blocking the circumferential distribution of the paste sealant 6. Indeed, if the axial extent X were equal to the height H of the neck 32, a surplus of paste sealant 6 on one side of a protrusion 5 would not be able to cross this barrier protrusion 5 and would not be able to fill a lack of paste sealant on the other side of the protrusion 5. This could prevent an even distribution of the paste seal in the outer 44 and inner 45 spaces. According to the disclosure, at least one space always remains, to serve as a passage for the paste seal for the purpose of distributing the paste seal uniformly.

According to another embodiment, all radial extents R of the protrusions 5 are advantageously within +/−10% of each other. That is, there will be no substantial differences in radial extent between the individual protrusions 5, making it possible to ensure uniform spacing with the base all around the neck 32. This further reduces the risk of the thickness of the paste sealant 6 becoming insufficient locally.

According to yet another embodiment, illustrated by FIG. 5a, all the radial extents R of the protrusions 5 are advantageously less than 2 mm, preferably between 0.2 and 0.8 mm and even more preferably equal to 0.5 mm. These radial extent values induce an optimal paste sealant thickness, giving it the best sealing and mechanical resistance performance.

According to yet another embodiment, illustrated by FIG. 1, the difference between the radius of the convex surface 321 of the neck 32 and the radius of the concave surface 421 of the recess 42 is advantageously substantially equal to the greater of the radial extents R.

Also, the difference between the radius of the concave surface 324 of the neck 32 and the radius of the convex surface 424 of the recess 42 is advantageously substantially equal to the greater of the radial extents R.

This choice of radii is induced by the need to limit the distance between a neck surface 32 and a facing surface of the base. This reduces the volume of the external 44 and inner 45 spaces, thus leading to a reduction in the amount of paste sealant 6 occupying these cavities.

Although various embodiments have been disclosed, a worker of ordinary skill in this art would recognize that certain modifications would come within the scope of this disclosure. For that reason, the following claims should be studied to determine the true scope and content of this disclosure.

LIST OF REFERENCE SIGNS

1: tank
3: sealing envelope
32: neck of the sealing envelope 3
321: convex neck surface 3322: proximal end of the neck 32
323: distal end of the neck 32
324: concave neck surface 32
4: base
42: recess of the base 4
421: concave recess surface 42
424: convex recess surface 42
44: outer space between the surfaces 321, 421
45: inner space between the surfaces 324, 424
5: protrusion
6: paste sealant
H: height of the neck 32
P: plane perpendicular to the axis A
R: radial extent of a protrusion 5
X: axial extent of a protrusion 5
α: angular extent of a protrusion 5

The invention claimed is:

1. A tank for pressurized gas such as hydrogen, comprising:
   a paste sealant;
   a sealing envelope comprising
      a body that is hollow delimits a volume, and is pierced by an opening, and
      a neck that is solid and tubular along an axis surrounding the opening, and the neck comprising a cylindrical convex surface and a cylindrical concave surface, wherein the neck comprises at least two radially extending protrusions, angularly equidistant on the cylindrical convex surface and/or on the cylindrical concave surface; and
   a base of cylindrical shape about the axis comprising a tubular recess, hollow along the axis, the tubular recess comprising a cylindrical concave surface and a cylindrical convex surface, wherein the tubular recess accommodates the neck, a diameter of the cylindrical concave surface of the tubular recess being greater than a diameter of the cylindrical convex surface of the neck so as to define an annular external space between the cylindrical convex surface of the neck and the cylindrical concave surface of the tubular recess, a diameter of the cylindrical convex surface of the tubular recess being smaller than a diameter of the cylindrical concave surface of the neck so as to define an annular inner space between the cylindrical concave surface of the neck and the cylindrical convex surface of the tubular recess, the paste sealant occupying the annular external space and the annular inner space uniformly.

2. The tank according to claim 1, wherein, each protrusion of the at least two radially extending protrusions has a radial extent, a difference between a radius of the cylindrical convex surface of the neck and a radius of the cylindrical concave surface of the tubular recess is equal to a greater radial extent and wherein a difference between the radius of the cylindrical concave surface of the neck and the radius of the cylindrical convex surface of the tubular recess is equal to the greater radial extent.

3. The tank according to claim 1, wherein a largest distance between a protrusion of the at least two radially extending protrusions and a distal end of the neck is less than or equal to 50% of a height of the neck.

4. The tank according to claim 1, wherein a largest distance between a protrusion of the at least two radially extending protrusions and a distal end of the neck is less than or equal to 25% of a height of the neck.

5. The tank according to claim 1, wherein a largest distance between a protrusion of the at least two radially extending protrusions and a distal end of the neck is less than or equal to 10% of a height of the neck.

6. The tank according to claim 1, wherein the at least two radially extending protrusions comprise at least three radially extending protrusions.

7. The tank according to claim 1, wherein the at least two radially extending protrusions comprise at least six radially extending protrusions.

8. The tank according to claim 1, wherein all protrusions of the at least two radially extending protrusions are dome-shaped, with a circular or oval base, or straight-lined, or rib-shaped parallel to the axis.

9. The tank according to claim 1, wherein all protrusions of the at least two radially extending protrusions are arranged in at least two distinct planes perpendicular to the axis and wherein each plane comprises at least two radially extending protrusions.

10. The tank according to claim 1, wherein all protrusions of the at least two radially extending protrusions extend tangentially along an angular extent of less than or equal to 10 degrees, and axially along an axial extent strictly less than a height of the neck.

11. The tank according to claim 1, wherein all protrusions of the at least two radially extending protrusions extend tangentially along an angular extent of less than or equal to 5 degrees, and axially along an axial extent strictly less than a height of the neck.

12. The tank according to claim 1, wherein all protrusions of the at least two radially extending protrusions extend tangentially along an angular extent of less than or equal to 3 degrees, and axially along an axial extent strictly less than a height of the neck.

13. The tank according to claim 1, wherein, each protrusion of the at least two radially extending protrusions has a radial extent, all radial extents of each of the protrusions are within a range of +/−10% of each other.

14. The tank according to claim 13, wherein all radial extents of the at least two radially extending protrusions are less than 2 mm.

15. The tank according to claim 13, wherein all radial extents of the at least two radially extending protrusions are between 0.2 and 0.8 mm.

16. The tank according to claim 13, wherein all radial extents of the at least two radially extending protrusions are equal to 0.5 mm.

* * * * *